United States Patent
Kawamura et al.

(10) Patent No.: US 9,073,292 B2
(45) Date of Patent: *Jul. 7, 2015

(54) HIGH STRENGTH GALVANIZED STEEL SHEET HAVING EXCELLENT FORMABILITY AND METHOD FOR MANUFACTURING THE SAME

(75) Inventors: Kenji Kawamura, Tokyo (JP); Hidetaka Kawabe, Chiba (JP); Kazuhiro Seto, Chiba (JP)

(73) Assignee: JFE Steel Corporation (JP)

( * ) Notice: Subject to any disclaimer, the term of this patent is extended or adjusted under 35 U.S.C. 154(b) by 287 days.

This patent is subject to a terminal disclaimer.

(21) Appl. No.: 13/805,101

(22) PCT Filed: Jun. 29, 2011

(86) PCT No.: PCT/JP2011/065414
§ 371 (c)(1),
(2), (4) Date: Feb. 26, 2013

(87) PCT Pub. No.: WO2012/002565
PCT Pub. Date: Jan. 5, 2012

(65) Prior Publication Data
US 2013/0244056 A1    Sep. 19, 2013

(30) Foreign Application Priority Data
Jun. 29, 2010    (JP) .................. 2010-147423

(51) Int. Cl.
| | | |
|---|---|---|
| *B32B 15/04* | (2006.01) | |
| *B32B 15/18* | (2006.01) | |
| *C23C 2/28* | (2006.01) | |
| *C21D 8/02* | (2006.01) | |
| *C22C 38/06* | (2006.01) | |
| *C23C 2/02* | (2006.01) | |
| *C23C 2/06* | (2006.01) | |
| *C23C 2/40* | (2006.01) | |
| *B32B 15/01* | (2006.01) | |
| *C22C 38/00* | (2006.01) | |
| *C22C 38/02* | (2006.01) | |
| *C22C 38/04* | (2006.01) | |

(52) U.S. Cl.
CPC ......... *B32B 15/18* (2013.01); *Y10T 428/12799* (2015.01); *Y10T 428/12972* (2015.01); *C21D 8/0226* (2013.01); *C21D 8/0263* (2013.01); *C21D 2211/005* (2013.01); *C21D 2211/009* (2013.01); *C22C 38/06* (2013.01); *C23C 2/02* (2013.01); *C23C 2/06* (2013.01); *C23C 2/28* (2013.01); *C23C 2/40* (2013.01); *B32B 15/013* (2013.01); *C22C 38/001* (2013.01); *C22C 38/02* (2013.01); *C22C 38/04* (2013.01)

(58) Field of Classification Search
CPC ...... C22C 38/06; C22C 38/04; C22C 38/001; C22C 38/02; C22C 38/00; B32B 15/01; B32B 15/013; B32B 15/18; C23C 2/02; C23C 2/28; C23C 2/40; C23C 2/06; C23C 2/00; C23C 2/26; Y10T 428/12799; Y10T 428/12972
USPC .................................................. 428/659, 684
See application file for complete search history.

(56) References Cited

U.S. PATENT DOCUMENTS

| | | | | |
|---|---|---|---|---|
| 2008/0053576 | A1* | 3/2008 | Takada et al. | 148/533 |
| 2010/0330392 | A1* | 12/2010 | Ono et al. | 148/533 |
| 2013/0233453 | A1* | 9/2013 | Kawamura et al. | 148/602 |

FOREIGN PATENT DOCUMENTS

| | | | |
|---|---|---|---|
| JP | 63-293121 | | 11/1988 |
| JP | 04-141566 | | 5/1992 |
| JP | 05-112832 | | 5/1993 |
| JP | 7-062487 | | 3/1995 |
| JP | 10-60593 | | 3/1998 |
| JP | 2000-219937 | | 8/2000 |
| JP | 2002-012947 | | 1/2002 |
| JP | 2006-233309 | | 9/2006 |
| WO | WO 2009/008551 | * | 1/2009 |

OTHER PUBLICATIONS

Machine Translation, Hamanaka et al., JP 05-112832, May 1993.*

* cited by examiner

*Primary Examiner* — Michael E La Villa
(74) *Attorney, Agent, or Firm* — DLA Piper LLP (US)

(57) ABSTRACT

A high strength galvanized steel sheet includes a steel sheet which is a base sheet and a galvanized layer on a surface of the steel sheet, the steel sheet has a composition including, by mass %, 0.08 to 0.15% of C, 0.5 to 1.5% of Si, 0.5 to 1.5% of Mn, 0.1% or less of P, 0.01% or less of S, 0.01 to 0.1% of Al, 0.005% or less of N, and the balance Fe with inevitable impurities, and a microstructure composed of 75 to 90% of a ferrite phase as a main phase and 10 to 25% of a second phase including at least pearlite in terms of an area fraction with respect to the entire microstructure; an average grain size of the pearlite is 5 μm or smaller; and the pearlite has an area fraction of 70% or greater with respect to the total area of the second phase.

16 Claims, No Drawings

HIGH STRENGTH GALVANIZED STEEL SHEET HAVING EXCELLENT FORMABILITY AND METHOD FOR MANUFACTURING THE SAME

RELATED APPLICATIONS

This is a §371 of International Application No. PCT/JP2011/065414, with an international filing date of Jun. 29, 2011, which is based on Japanese Patent Application No. 2010-147423, filed Jun. 29, 2010, the subject matter of which is incorporated by reference.

TECHNICAL FIELD

This disclosure relates to a high strength galvanized steel sheet which is suitable for use as, for example, a strength member of a vehicle component, and is required to have excellent formability (stretch flangeability) and corrosion resistance; and a method for manufacturing the high strength galvanized steel sheet.

BACKGROUND

In recent years, an improvement in fuel economy of vehicles has become an important object from the point of view of preservation of the global environment. Accordingly, the trend of strengthening materials used and reducing thickness of members to decrease vehicle body weight has been intensified. As the materials used, high strength steel sheets having a tensile strength of 540 MPa or higher are particularly required. However, since strengthening of steel sheets leads to degradation of formability, high strength steel sheets having excellent formability are desired and, particularly, there is a high demand for steel sheets having a small thickness (thin steel sheets) having excellent formability.

To satisfy the demand, various multi phase steel sheets have been proposed such as a dual phase steel sheet (DP steel sheet) having a dual phase microstructure composed of a ferrite phase and a martensite phase and a steel sheet having a multi phase microstructure including a ferrite phase, a martensite phase, and a bainite phase.

For example, in Japanese Unexamined Patent Application Publication No. 63-293121, there is a description of a method for manufacturing a high strength cold rolled steel sheet having excellent local ductility including: subjecting a cold rolled steel sheet having a composition including 0.08 to 0.30% of C, 0.1 to 2.5% of Si, 0.5 to 2.5% of Mn, and 0.01 to 0.15% of P to recrystallization annealing at a temperature equal to or higher than an $A_{c1}$ point; subsequently performing forced air-cooling to a temperature region of an $A_{r1}$ point to 600° C.; performing rapid cooling at a cooling rate equal to or higher than 100° C./s to form a multi phase microstructure composed of a ferrite phase and a low-temperature transformed phase; and subsequently performing overaging at a temperature of 350° C. to 600° C. so that a ratio Hv (L)/Hv ($\alpha$) of the hardness Hv (L) of the low-temperature transformed phase to ferrite hardness Hv ($\alpha$), which is obtained by a predetermined relational expression, satisfies a range of 1.5 to 3.5. In the technique described in JP 63-293121, the volume fraction of the low-temperature transformed phase is increased by increasing the quenching start temperature, and then overaging is performed at a temperature of 350° C. to 600° C. to precipitate C in the ferrite and soften the low-temperature transformed phase to thereby reduce the ratio Hv (L)/Hv ($\alpha$), and thus local ductility is improved.

However, the technique described in JP 63-293121 has problems in that continuous annealing equipment is required which can perform rapid cooling (quenching) after recrystallization annealing, and it is required to add large amounts of alloying elements to suppress a rapid decrease in strength due to the overaging at a high temperature.

In addition, in Japanese Unexamined Patent Application Publication No. 05-112832, there is a description of a method for manufacturing a high strength hot rolled steel sheet with a low yield ratio having excellent corrosion resistance, including: subjecting a steel slab containing 0.02 to 0.25% of C, 2.0% or less of Si, 1.6 to 3.5% of Mn, 0.03 to 0.20% of P, 0.02% or less of S, 0.05 to 2.0% of Cu, 0.005 to 0.100% of sol.Al, and 0.008% or less of N to hot rolling to form a hot rolled coil; pickling the hot rolled coil; and subsequently annealing the hot rolled coil at a temperature of 720° C. to 950° C. by a continuous annealing line. According to the technique described in JP 05-112832, it is possible to manufacture a high strength hot rolled steel sheet which maintains a low yield ratio, high ductility, and good stretch flangeability, is excellent in corrosion resistance, and has a multi phase microstructure.

In the technique described in JP 05-112832, large amounts of P and Cu are essentially added in combination. However, when a large amount of Cu is present, hot workability is degraded; and when a large amount of P is present, steel is embrittled. In addition, P shows a strong tendency to segregate in steel, and this segregated P causes problems such as degradation of stretch flangeability of steel sheets and embrittlement of welded zones. In addition, when a large amount of P is present, wettability is degraded.

In addition, in Japanese Unexamined Patent Application Publication No. 10-60593, there is a description of a high strength cold rolled steel sheet which has a composition containing 0.03 to 0.17% of C, 1.0% or less of Si, 0.3 to 2.0% of Mn, 0.010% or less of P, 0.010% or less of S, and 0.005 to 0.06% of Al and satisfying the relation of C (%)>(3/40)×Mn and a microstructure composed of a ferrite phase and a second phase including mainly bainite or pearlite, satisfies the relation of (Vickers hardness of second phase)/(Vickers hardness of ferrite phase)<1.6, and is excellent in the balance between strength and stretch flangeability. The high strength cold rolled steel sheet described in JP 10-60593 is obtained by subjecting a steel (slab) having the above-described composition to hot rolling; coiling at a temperature equal to or lower than 650° C.; pickling; subsequently cold rolling; annealing including soaking at a temperature equal to or higher than an $A_1$ point and equal to or lower than ($A_3$ point+50° C.), subsequent slow cooling to a temperature $T_1$ of 750° C. to 650° C. at a rate of 20° C./s or lower, and subsequent cooling from $T_1$ to 500° C. at a rate of 20° C./s or higher; and subsequently overaging at a temperature of 500° C. to 250° C.

However, although the high strength cold rolled steel sheet described in JP 10-60593 has excellent stretch flangeability, in the case of a high strength of 540 MPa or higher, elongation is less than 26% and a problem occurs in that an elongation sufficient for maintaining desired excellent formability cannot be ensured.

In addition, in many cases, vehicle components are exposed to the corrosive environment and are thus required to have corrosion resistance in addition to the above-described strengthening and improvement in formability. A high strength galvanized steel sheet having excellent formability is demanded for such an application.

To satisfy the demand, for example, in Japanese Unexamined Patent Application Publication No. 04-141566, there is a description of a method for manufacturing a high strength galvannealed steel sheet including: heating a steel slab which contains 0.05 to 0.15% of C, 0.8 to 1.6% of Mn, 0.3 to 1.5% of Si, and the balance Fe with inevitable impurities and contains 0.02% or less of S as impurities, at a temperature of 1280° C. or higher; subjecting the steel slab to hot rolling with a finish temperature of 880° C. or higher to form a hot rolled sheet; annealing the hot rolled sheet in a temperature region of 750° C. to 900° C.; dipping the annealed steel sheet in a galvanizing bath in the course of cooling after the annealing; and subsequently performing alloying at a temperature of 520° C. to 640° C.

However, in JP 04-141566, it is necessary to heat a steel slab at a high temperature of 1280° C. or higher and the crystal grains become too coarse. Even after hot rolling, the microstructure of the hot rolled sheet remains coarse, and it is difficult to form a steel sheet fine microstructure after annealing. In addition, a large amount of scale loss is generated, yield is lowered, the amount of consumed energy becomes large. A problem also occurs in that the risk of generation of flaws increases. Furthermore, the target thickness is a relatively large thickness of 2.6 mm and it is unclear whether or not a high strength coated steel sheet having a small thickness and excellent formability can be manufactured according to JP 04-141566.

It could therefore be helpful to provide a high strength galvanized steel sheet that has a small sheet thickness of about 1.0 to 1.8 mm and excellent formability; and a method for manufacturing the high strength galvanized steel sheet. Here, the "high strength" means a tensile strength TS equal to or higher than 540 MPa, and preferably equal to or higher than 590 MPa. In addition, the "excellent formability" means a case in which the elongation El is equal to or greater than 30% (when using a JIS No. 5 test piece) and a hole expanding ratio λ in a hole expanding test based on the Japan Iron and Steel Federation Standard JFST 1001-1996 is equal to or higher than 80%.

SUMMARY

We thus provide:

(1) A high strength galvanized steel sheet having excellent formability, including a steel sheet which is a base sheet and a galvanized layer on a surface of the steel sheet, in which the steel sheet is a high strength steel sheet which has a composition including, by mass %, 0.08 to 0.15% of C, 0.5 to 1.5% of Si, 0.5 to 1.5% of Mn, 0.1% or less of P, 0.01% or less of S, 0.01 to 0.1% of Al, 0.005% or less of N, and the balance Fe with inevitable impurities, and a microstructure composed of a ferrite phase which is a main phase and a second phase including at least pearlite; the ferrite phase is in the range of 75 to 90% and the pearlite is in the range of 10 to 25% in terms of an area fraction with respect to the entire microstructure; an average grain size of the pearlite is 5 μm or smaller; and the pearlite has an area fraction of 70% or greater with respect to the total area of the second phase.

(2) The high strength galvanized steel sheet according to (1), in which the composition further includes, by mass %, one or more selected from 0.05 to 0.5% of Cr, 0.005 to 0.2% of V, and 0.005 to 0.2% of Mo.

(3) The high strength galvanized steel sheet according to (1) or (2), in which the composition further includes, by mass %, one or two selected from 0.01 to 0.1% of Ti and 0.01 to 0.1% of Nb.

(4) The high strength galvanized steel sheet according to any one of (1) to (3), in which the composition further includes, by mass %, 0.0003 to 0.0050% of B.

(5) The high strength galvanized steel sheet according to any one of (1) to (4), in which the composition further includes, by mass %, one or two selected from 0.05 to 0.5% of Ni and 0.05 to 0.5% of Cu.

(6) The high strength galvanized steel sheet according to any one of (1) to (5), in which the composition further includes, by mass %, one or two selected from 0.001 to 0.005% of Ca and 0.001 to 0.005% of REM.

(7) The high strength galvanized steel sheet according to any one of (1) to (6), in which the galvanized layer is a galvannealed layer.

(8) A method for manufacturing a high strength galvanized steel sheet having excellent formability, including a hot rolling step of subjecting a steel to hot rolling to form a hot rolled sheet; pickling of the hot rolled sheet; a continuous annealing step of subsequently subjecting the hot rolled sheet to annealing and subsequent cooling to a temperature for entry into a galvanizing bath; and, after the continuous annealing step, a galvanizing step of performing galvanizing to form a galvanized layer on a surface of the hot rolled sheet by dipping the hot rolled sheet in the galvanizing bath, the continuous annealing step and the galvanizing step being continuously performed with a continuous galvanizing line, to manufacture a galvanized steel sheet having the galvanized layer on the surface thereof, in which the steel has a composition which includes, by mass %, 0.08 to 0.15% of C, 0.5 to 1.5% of Si, 0.5 to 1.5% of Mn, 0.1% or less of P, 0.01% or less of S, 0.01 to 0.1% of Al, 0.005% or less of N, and the balance Fe with inevitable impurities; the annealing is performed by holding the sheet for 5 to 400 s in a first temperature region of an $A_{c1}$ transformation point to an $A_{c3}$ transformation point; and, in the cooling after the annealing, the sheet is cooled from the first temperature region to 700° C. at an average cooling rate of 5° C./s or higher, and a residence time in a second temperature region of 700° C. to the temperature for entry into the galvanizing bath is in the range of 15 to 400 s.

(9) The method for manufacturing a high strength steel sheet according to (8), in which the hot rolling step includes heating the steel at a temperature of 1100° C. to 1280° C.; subsequently subjecting the steel to hot rolling with a finish hot rolling temperature of 870° C. to 950° C. to form a hot rolled sheet; and, after the hot rolling, coiling the hot rolled sheet at a coiling temperature of 350° C. to 720° C.

(10) The method for manufacturing a high strength galvanized steel sheet according to (8) or (9), in which a cooling time in a temperature region of 700° C. to 550° C. in the second temperature region is 10 s or longer.

(11) The method for manufacturing a high strength galvanized steel sheet according to any one of (8) to (10), in which an alloying step of alloying the galvanized layer is performed subsequent to the galvanizing step.

(12) The method for manufacturing a high strength galvanized steel sheet according to any one of (8) to (11), in which the composition further includes, by mass %, one or more selected from 0.05 to 0.5% of Cr, 0.005 to 0.2% of V, and 0.005 to 0.2% of Mo.

(13) The method for manufacturing a high strength galvanized steel sheet according to any one of (8) to (12), in which the composition further includes, by mass %, one or two selected from 0.01 to 0.1% of Ti and 0.01 to 0.1% of Nb.

(14) The method for manufacturing a high strength galvanized steel sheet according to any one of (8) to (13), in which the composition further includes, by mass %, 0.0003 to 0.0050% of B.

(15) The method for manufacturing a high strength galvanized steel sheet according to any one of (8) to (14), in which the composition further includes, by mass %, one or two selected from 0.05 to 0.5% of Ni and 0.05 to 0.5% of Cu.

(16) The method for manufacturing a high strength galvanized steel sheet according to any one of (8) to (15), in which the composition further includes, by mass %, one or two selected from 0.001 to 0.005% of Ca and 0.001 to 0.005% of REM.

It is possible to easily manufacture a high strength galvanized steel sheet having excellent formability with a high strength, that is, a tensile strength TS of 540 MPa or higher, an elongation El of 30% or greater, and a stretch flangeability $\lambda$ of 80% or higher at a low cost, which is considerably advantageous in the industry. Cold rolling can be omitted, which considerably contributes to a decrease in the manufacturing cost, an improvement in productivity, and the like. When the steel sheet is applied to a component of a vehicle body, it can contribute largely to a decrease in vehicle body weight.

DETAILED DESCRIPTION

We conducted thorough studies of the influence of the composition and the microstructure of a steel sheet which is used as a base sheet on the strength and formability of the steel sheet. As a result, we found that a microstructure composed of a ferrite phase as a main phase and a second phase including mainly fine pearlite can be formed even in a small thickness by subjecting a hot rolled sheet in which the amounts of alloying elements are adjusted, to annealing which includes heating to an appropriate dual phase temperature region and appropriate cooling without cold rolling, and thus a desired high strength can be ensured, formability is significantly improved, and a thin, high strength steel sheet having excellent formability with a desired elongation and a desired hole expanding ratio can be ensured.

The detailed mechanism with regard to a significant improvement in formability by directly performing appropriate annealing on a hot rolled sheet without cold rolling has not been clear until now, but we believe that the following mechanism works.

When a hot rolled sheet is subjected to annealing including heating to a dual phase temperature region without cold rolling, transformation from $\alpha$ to $\gamma$ only occurs in the annealing heating, and new recrystallization does not occur. In this case, transformation from $\alpha$ to $\gamma$ only occurs mainly in a place with a high C concentration, and a more uniform microstructure can be obtained. In addition, C of which the diffusion rate is high is redistributed to $\alpha$ and $\gamma$ to reach the equilibrium composition in the annealing. Accordingly, the precipitation of film cementite at the grain boundary is suppressed, which probably particularly improves stretch flangeability. On the other hand, when the hot rolled sheet is subjected to cold rolling and then subjected to annealing, recrystallization and transformation from $\alpha$ to $\gamma$ competitively occur in the annealing heating, and thus the microstructure tends to become nonuniform and a significant improvement in formability is less likely to be expected. Such a high strength steel sheet is suitable as a base sheet of a high strength galvanized steel sheet.

First, reasons for a limitation on the composition of a steel sheet which is a base sheet of a galvanized steel sheet will be described. Hereinafter, mass % will be simply expressed by % unless otherwise noted.

C: 0.08 to 0.15%

C is an element which contributes to an increase in the strength of a steel sheet and effectively acts on the formation of a multi phase microstructure composed of a ferrite phase and a second phase other than the ferrite phase. 0.08% or more of C is required to ensure a high strength, that is, a desired tensile strength of 540 MPa or higher. When more than 0.15% of C is present, spot weldability is degraded, and formability such as ductility is degraded. Therefore, the C content is 0.08 to 0.15%, and preferably 0.10 to 0.15%.

Si: 0.5 to 1.5%

Si is an element which forms a solid solution in steel and thus effectively acts on the strengthening of ferrite, and also contributes to an improvement in ductility. To ensure a high strength, that is, a desired tensile strength of 540 MPa or higher, 0.5% or more of Si is required. When an excessive amount more than 1.5% of Si is present, generation of red scale and the like is promoted, surface quality of a steel sheet is degraded, chemical treatability is degraded, degradation of adhesion of the coating is caused, and corrosion resistance after coating tends to deteriorate. In addition, when an excessive amount of Si is present, resistance weldability deteriorates due to an increase in electric resistance in the resistance welding. Therefore, the Si content is 0.5 to 1.5%, and preferably 0.7 to 1.2%.

Mn: 0.5 to 1.5%

Mn is an element which contributes to an increase in the strength of a steel sheet and effectively acts on the formation of a multi phase microstructure. 0.5% or more of Mn is required to obtain such an effect. When more than 1.5% of Mn is present, a martensite phase tends to be formed in the course of cooling in the annealing, and thus formability, particularly, stretch flangeability is degraded. Therefore, the Mn content is 0.5 to 1.5%, and preferably 0.7 to 1.5%.

P: 0.1% or Less

P is an element which forms a solid solution in steel and thus acts on an increase in the strength of a steel sheet. However, P shows a strong tendency to segregate to the grain boundary and lowers the bonding strength of the grain boundary, thereby causing degradation of formability. In addition, when a large amount of P is present, not only wettability and chemical treatability are degraded, but also the surface quality of a steel sheet is adversely affected. Such an adverse effect of P becomes serious when more than 0.1% of P is present. Therefore, the P content is limited to 0.1% or less. The P content is preferably decreased to 0.1% or less and minimized to avoid such an adverse effect of P. However, excessive reduction of the P content leads to an increase in the manufacturing cost, and hence about 0.001% or more of P is preferable. The P content is preferably 0.03% or less.

S: 0.01% or Less

S mainly forms sulfides (inclusions) such as MnS in steel, and degrades formability of a steel sheet, particularly, local elongation. In addition, the presence of sulfides (inclusions) degrades weldability. Such an adverse effect of S becomes serious when more than 0.01% of S is present. Therefore, the S content is 0.01% or less. The S content is preferably decreased to 0.01% or less and minimized to avoid such an adverse effect of S. However, excessive reduction of the S content leads to an increase in the manufacturing cost, and hence about 0.0001% or more of S is preferable.

Al: 0.01 to 0.1%

Al is an element which acts as a deoxidizing agent and is essential to enhance the cleanliness of a steel sheet. Furthermore, Al effectively acts on the improvement of the yield of a carbide-forming element. 0.01% or more of Al is required to obtain such an effect. When less than 0.01% of Al is present, Si-based inclusions which are the origin of delayed fracture are not sufficiently removed, and thus the risk of occurrence of delayed fracture is increased. However, when more than 0.1% of Al is present, the above-described effect is saturated and thus the effect matching the content cannot be expected, which is economically disadvantageous. In addition, formability is degraded and the tendency for generation of surface defects is increased. Therefore, the Al content is 0.01 to 0.1%, and preferably 0.01 to 0.05%.

N: 0.005% or Less

N is inherently a detrimental element and the content thereof is desirably minimized, but up to 0.005% of N can be permitted. Therefore, the N content is 0.005% or less. Excessive reduction of the N content leads to an increase in the manufacturing cost, and hence about 0.0001% or more of N is preferably present.

The above-described components are basic components. However, in addition to the basic components, one or more selected from 0.05 to 0.5% of Cr, 0.005 to 0.2% of V, and 0.005 to 0.2% of Mo, and/or one or two selected from 0.01 to 0.1% of Ti and 0.01 to 0.1% of Nb, and/or 0.0003 to 0.0050% of B, and/or one or two selected from 0.05 to 0.5% of Ni and 0.05 to 0.5% of Cu, and/or one or two selected from 0.001 to 0.005% of Ca and 0.001 to 0.005% of REM can be selected and present in accordance with the need.

One or More Selected from 0.05 to 0.5% of Cr, 0.005 to 0.2% of V, and 0.005 to 0.2% of Mo All of Cr, V, and Mo are elements which increase the strength of a steel sheet and contribute to formation of a multi phase microstructure, and one or more selected in accordance with the need can be present. It is desired that 0.05% or more of Cr, 0.005% or more of V, or 0.005% or more of Mo is present to obtain such an effect. When an excessive amount more than 0.5% of Cr, an excessive amount more than 0.2% of V, or an excessive amount more than 0.2% of Mo is present, it is difficult to form a desired amount of pearlite in the cooling after annealing, and thus a desired multi phase microstructure cannot be ensured, whereby stretch flangeability is degraded and thus formability is degraded. Therefore, when Cr, V, and Mo are present, the Cr content is preferably 0.05 to 0.5%, the V content is preferably 0.005 to 0.2%, and the Mo content is preferably 0.005 to 0.2%.

One or Two Selected from 0.01 to 0.1% of Ti and 0.01 to 0.1% of Nb

Both of Ti and Nb are elements which increase the strength of a steel sheet by precipitation strengthening, and one or two selected in accordance with the need can be present. It is desired that 0.01% or more of Ti or 0.01% or more of Nb is present to obtain such an effect. When an excessive amount more than 0.1% of Ti or an excessive amount more than 0.1% of Nb is present, formability and shape fixability are degraded. Therefore, when Ti and Nb are present, the Ti content is preferably 0.01 to 0.1% and the Nb content is preferably 0.01 to 0.1%.

B: 0.0003 to 0.0050%

B is an element which segregates to the austenite grain boundary and acts to suppress formation and growth of ferrite from the grain boundary. B can be present in accordance with the need. It is desired that 0.0003% or more of B is present to obtain such an effect. However, when more than 0.0050% of B is present, formability is degraded. Therefore, when B is present, the B content is preferably 0.0003 to 0.0050%. In addition, it is necessary to suppress the formation of BN to obtain the above-described effect of B, and B is preferably present together with Ti.

One or Two Selected from 0.05 to 0.5% of Ni and 0.05 to 0.5% of Cu

Both of Ni and Cu are elements which act to increase the strength of a steel sheet and also act to promote internal oxidation to thereby improve adhesion of the coating. Ni and Cu can be selected and present in accordance with the need. It is desired that 0.05% or more of Ni or 0.05% or more of Cu is present to obtain such an effect. However, when more than 0.5% of Ni or more than 0.5% of Cu is present, it is difficult to form a desired amount of pearlite in the cooling after annealing, and thus a desired multi phase microstructure cannot be ensured and stretch flangeability is degraded, whereby formability is degraded. Therefore, when Ni and Cu are present, the Ni content is preferably 0.05 to 0.5%, and the Cu content is preferably 0.05 to 0.5%.

One or Two Selected from 0.001 to 0.005% of Ca and 0.001 to 0.005% of REM

Both of Ca and REM are elements which contribute to controlling the form of sulfide. These act to spheroidize the form of sulfide and suppress the adverse effect of sulfide on formability, particularly, stretch flangeability. To obtain such an effect, it is desired that 0.001% or more of Ca or 0.001% or more of REM is present. However, when more than 0.005% of Ca or more than 0.005% of REM is present, the amount of inclusions increases, and many surface defects and internal defects are generated. Therefore, when Ca and REM are present, the Ca content is preferably 0.001 to 0.005%, and the REM content is preferably 0.001 to 0.005%.

The balance other than the above-described components is Fe and inevitable impurities.

Our steel sheets have the above-described composition and a microstructure composed of a ferrite phase as a main phase and a second phase including at least pearlite.

The ferrite phase which is a main phase has an area fraction of 75 to 90% with respect to the entire microstructure. When the area fraction of the ferrite phase is lower than 75%, the desired elongation and desired hole expanding ratio cannot be ensured, and formability is degraded. On the other hand, when the area fraction of the ferrite phase exceeds 90%, the area fraction of the second phase is lowered and the desired high strength cannot be ensured. Therefore, the area fraction of the ferrite phase which is a main phase is 75 to 90%, and preferably 80 to 90%.

In addition, at least pearlite is included in the second phase. The pearlite has an area fraction of 10 to 25% with respect to the entire microstructure. When the area fraction of the pearlite is lower than 10%, the desired hole expanding ratio cannot be ensured and stretch flangeability is degraded, whereby formability is degraded. On the other hand, when the pearlite has a high area fraction exceeding 25%, the amount of the interface between the ferrite phase and the pearlite increases and voids tends to be formed. Accordingly, stretch flangeability is degraded and thus formability is degraded.

The pearlite is made to be formed as fine grains having an average grain size of 5 μm or less. When the pearlite has an average grain size exceeding 5 μm and includes coarse grains, stress is concentrated at the pearlite grains (interfaces) in the forming of a steel sheet and microvoids are formed. Accordingly, stretch flangeability is degraded and thus formability is degraded. Therefore, the average grain size of the pearlite is limited to 5 μm or less, and preferably 4.0 μm or less.

The second phase in the microstructure of a steel sheet is a phase including at least pearlite in which the pearlite has an area fraction of 70% or greater with respect to the total area of the second phase, that is, a phase mainly including the pearlite. When the pearlite has an area fraction of less than 70% with respect to the total area of the second phase, the amount of a hard martensite or bainite phase, or retained γ becomes excessively large, and thus formability tends to be degraded. Therefore, the pearlite is limited to an area fraction of 70% or greater with respect to the total area of the second phase. The area fraction is preferably 75 to 100%.

The second phase may include bainite, martensite, retained austenite (retained γ) and the like, in addition to pearlite.

However, particularly, bainite and martensite are hard phases and retained γ is transformed into martensite during forming, and hence degrade formability. Therefore, the amounts of the bainite, martensite and retained austenite are desirably minimized, and these preferably have an area fraction of 5% or less in total with respect to the entire microstructure, and more preferably 3% or less in total.

Next, a preferred method for manufacturing a galvanized steel sheet will be described.

Steel having the above-described composition is used as a starting material. It is not necessary to particularly limit the method for manufacturing the steel. However, from the point of view of productivity, molten steel having the above-described composition is preferably refined through a standard refining method using a steel converter, an electric furnace or the like, and formed into a steel such as a slab through a standard casting method such as continuous casting. Alternatively, ingot making-slabbing, thin-slab casting, or the like can be applied.

Steel having the above-described composition is subjected to a hot rolling step to be formed into a hot rolled sheet. The hot rolling step preferably includes: heating the steel at a temperature of 1100° C. to 1280° C.; subjecting the heated steel to hot rolling with a finish hot rolling temperature of 870° C. to 950° C. to form a hot rolled sheet; and, after the hot rolling, coiling the hot rolled sheet at a coiling temperature of 350° C. to 720° C.

When the heating temperature of the steel is lower than 1100° C., deformation resistance becomes too high, and thus a rolling load becomes excessive and it becomes difficult to perform the hot rolling in some cases. On the other hand, when the heating temperature is higher than 1280° C., the crystal grains become excessively coarse, and thus a desired steel sheet fine microstructure is less likely to be ensured even when hot rolling is performed. Therefore, the heating temperature for hot rolling is preferably 1100° C. to 1280° C., and more preferably lower than 1280° C.

When the finish hot rolling temperature is lower than 870° C., ferrite (α) and austenite (γ) are formed during the rolling, and a banded microstructure tends to be formed in the steel sheet. This banded microstructure remains even after annealing, and causes anisotropy in obtained steel sheet characteristics or causes degradation of formability in some cases. On the other hand, when the finish hot rolling temperature is higher than 950° C., the microstructure of the hot rolled sheet becomes coarse, and thus a desired microstructure cannot be obtained even after annealing in some cases. Therefore, the finish hot rolling temperature is preferably 870° C. to 950° C.

When the coiling temperature after the hot rolling is lower than 350° C., bainitic ferrite, bainite, martensite and the like are formed, and the hot rolled microstructure tends to become hard and nonuniform in grain size. Even in the subsequent annealing, the hot rolled microstructure is inherited and the microstructure tends to be nonuniform in grain size, whereby desired formability cannot be ensured in some cases. On the other hand, when the coiling temperature is a high temperature of higher than 720° C., it becomes difficult to ensure uniform mechanical characteristics over the entire steel sheet in the longitudinal direction and in the width direction. Therefore, the coiling temperature is preferably 350° C. to 720° C., and more preferably 500° C. to 680° C.

The hot rolled sheet is pickled in a standard manner to remove scale formed on a steel sheet surface of the hot rolled sheet which is obtained through the hot rolling step. After that, the hot rolled sheet is continuously subjected, with a continuous galvanizing line directly without cold rolling, to a continuous annealing step of performing annealing and subsequent cooling and, after the continuous annealing step, a galvanizing step of performing galvanizing to form a galvanized layer on a surface of the hot rolled sheet by dipping the hot rolled sheet in a galvanizing bath.

The annealing is performed by holding the sheet for 5 to 400 s in a first temperature region of an $A_{c1}$ transformation point to an $A_{c3}$ transformation point.

In the annealing, when a temperature (heating temperature) in the first temperature region is lower than the $A_{c1}$ transformation point, or a holding time (annealing time) in the first temperature region is shorter than 5 s, carbide in the hot rolled sheet is not sufficiently melted, or transformation from α to γ does not occur or does not sufficiently occur. Accordingly, a desired multi phase microstructure cannot be ensured by the subsequent cooling, and thus a steel sheet having ductility and stretch flangeability satisfying a desired elongation and a desired hole expanding ratio cannot be obtained.

On the other hand, when the heating temperature of the annealing is higher than the $A_{c3}$ transformation point, austenite grains considerably coarsen and the microstructure formed by the subsequent cooling coarsens, and hence formability is degraded in some cases.

When the holding time (annealing time) in the first temperature region is longer than 400 s, the treatment time becomes long, the amount of consumed energy becomes large, and the manufacturing cost rises. Therefore, the annealing is limited to a treatment in which the sheet is held for 5 to 400 s in the first temperature region of the $A_{c1}$ transformation point to the $A_{c3}$ transformation point.

A value which is calculated using Expression (1) is used as the $A_{c1}$ transformation point of each steel sheet, and a value which is calculated using Expression (2) is used as the $A_{c3}$ transformation point. Among the elements in the expressions, when there is an element which is not present, the element is regarded as 0.

$$A_{c1} \text{ Transformation Point (° C.)} = 723 + 29.1\text{Si} - 10.7\text{Mn} - 16.9\text{Ni} + 16.9\text{Cr} + 6.38\text{W} + 290\text{As} \quad (1)$$

$$A_{c3} \text{ Transformation Point (° C.)} = 910 - 203\sqrt{\text{C}} + 44.7\text{Si} - 30\text{Mn} + 700\text{P} + 400\text{Al} - 15.2\text{Ni} - 11\text{Cr} - 20\text{Cu} + 31.5\text{Mo} + 104\text{V} + 400\text{Ti} + 13.1\text{W} + 120\text{As} \quad (2)$$

where C, Si, Mn, Ni, Cr, W, As, C, P, Al, Cu, Mo, V, and Ti each represent the content (mass %) of the element.

The cooling after the annealing is a treatment in which cooling is performed at an average cooling rate of 5° C./s or higher from the above-described first temperature region to 700° C. and a residence time in a second temperature region ranging from 700° C. to a temperature for entry into a galvanizing bath is 15 to 400 s.

When the average cooling rate from the first temperature region to 700° C. is lower than 5° C./s, the amount of ferrite formed becomes excessively large, and thus a desired multi phase microstructure is not obtained and formability is degraded, and furthermore, a desired tensile strength (540 MPa or higher) cannot be ensured in some cases. Therefore, the average cooling rate from the first temperature region to 700° C. is 5° C./s or higher, preferably 20° C./s or lower, and more preferably 5 to 15° C./s.

The residence time in the second temperature region ranging from 700° C. to a temperature for entry into a galvanizing bath is an important factor of the formation of pearlite which is included in the second phase. Herein, the "residence time" means a time for which the sheet remains in the above-described second temperature region, which includes a case of holding the sheet at a specific temperature in the second temperature region, a case of cooling the sheet in the second temperature region at a specific cooling rate, and a case of cooling the sheet in combination of these cases. When the residence time in the second temperature region is shorter than 15 s, pearlite transformation does not occur or the amount of pearlite formed is insufficient, and a desired multi phase microstructure cannot be ensured.

On the other hand, when the residence time in the second temperature region is longer than 400 s, productivity is degraded. Therefore, the residence time in the second temperature region is 15 to 400 s, preferably 150 s or shorter, and more preferably 100 s or shorter. Note that, for ensuring a desired amount of pearlite, the cooling time in a temperature region of 700° C. to 550° C. in the second temperature region is preferably 10 s or longer, that is, the average cooling rate in the temperature region of 700° C. to 550° C. is preferably 15° C./s or lower. When the cooling time in the temperature region of 700° C. to 550° C. is shorter than 10 s, the pearlite is not sufficiently formed and thus a desired multi phase microstructure is not obtained, and desired formability cannot be ensured in some cases.

After the above-described cooling is performed, the hot rolled sheet is subjected to a galvanizing step.

In the galvanizing step, in general, galvanizing is performed to form a galvanized layer having a desired thickness on a surface of the hot rolled sheet by dipping the hot rolled sheet in a galvanizing bath which is held at a temperature near 450° C. As the conditions for the galvanizing, standard conditions may be applied in accordance with a desired thickness of a galvanized layer. The conditions are not required to be limited. The bath temperature of the galvanizing bath is preferably 420° C. to 520° C. When the temperature is lower than 420° C., zinc is solidified, and when the temperature is higher than 520° C., wettability is degraded.

After the galvanizing step, an alloying step of alloying the galvanized layer formed by the galvanizing may be performed in accordance with the need. The alloying is preferably performed by a heat treatment at 480° C. to 550° C. When the temperature is outside the above-described temperature range, desired alloying cannot be achieved.

Hereinafter, our steel sheets and methods will be more specifically described on the basis of examples. However, this disclosure is not limited to these examples.

EXAMPLES

Molten steels each having a composition shown in Table 1 were refined and formed into steels in a standard manner. These steels were subjected to hot rolling under the conditions of the heating temperatures and the finish hot rolling temperatures shown in Table 2, and thus 1.6 mm-thick hot rolled sheets were formed. After the hot rolling, the hot rolled sheets were wound into a coil shape at the coiling temperatures shown in Table 2. Thereafter, pickling was performed. Note that, after the pickling, some hot rolled sheets (sheet thickness: 3.2 mm) were subjected to cold rolling with a rolling reduction of 50% to be formed into 1.6 mm-thick cold rolled sheets and defined as comparative examples.

Under the conditions shown in Table 2, the obtained hot rolled sheets and cold rolled sheets were further subjected to a continuous annealing step of annealing each sheet in which the sheet was heated at a temperature in a first temperature region and held, and cooling the sheet in which the sheet was cooled from the temperature in the first temperature region to 700° C. at an average cooling rate shown in Table 2, the sheet was further cooled from 700° C. to 550° C. in a second temperature region at a cooling rate (cooling time) shown in Table 2, and a residence time in the second temperature region ranging from 700° C. to a temperature of dipping in a galvanizing bath was that shown in Table 2. The transformation points of the steel sheets shown in Table 2 are values calculated using the above-described Expressions (1) and (2).

The hot rolled sheets subjected to the above-described continuous annealing step were subjected to a galvanizing step to form a galvanized layer by dipping in a galvanizing bath (bath temperature: 460° C.), and thus galvanized sheets were formed. Some galvanized sheets were subjected to an alloying step to alloy the galvanized layer by heating at 500° C., and thus galvannealed sheets were formed. After the galvanizing step or the alloying step, the galvanized sheets or the galvannealed sheets were subjected to temper rolling at an elongation of 0.5%.

Test pieces were sampled from the obtained galvanized sheets and galvannealed sheets, and subjected to observation of the microstructure, a tensile test, and a hole expanding test. The test methods were as follows.

(1) Observation of Microstructure

A test piece for observation of the microstructure was sampled from an obtained galvanized sheet or galvannealed sheet. A section (L section) parallel to the rolling direction was polished and corroded with a nital solution, and the microstructure was observed in three or more fields of view by using a scanning electron microscope (magnification: 3000 times) and photographed to determine the type of the microstructure and the area fraction of each phase with respect to the entire microstructure. Moreover, the area fraction of the total area of the second phase with respect to the entire microstructure was calculated. In addition, the average crystal grain size of the pearlite included in the second phase was also calculated. Regarding the average crystal grain size of the pearlite, the area of each pearlite grain was measured; an equivalent circle diameter was calculated from the area; the obtained equivalent circle diameters of the grains were arithmetically averaged; and the arithmetically averaged value was defined as the average crystal grain size of the pearlite grains. The number of the pearlite grains measured was equal to or more than 20. In addition, the area fraction of the pearlite with respect to the total area of the second phase was also calculated.

(2) Tensile Test

A JIS No. 5 test piece was sampled from an obtained galvanized sheet or galvannealed sheet such that the tensile direction matched a direction perpendicular to the rolling direction. A tensile test was performed on the basis of the provisions of JIS Z 2241, and tensile characteristics (yield point YP, tensile strength TS, and elongation El) were determined.

(3) Hole Expanding Test

A 100 mm-square piece for a hole expanding test was sampled from an obtained galvanized sheet or galvannealed sheet. The hole expanding test was performed on the basis of the Japan Iron and Steel Federation Standard JFST 1001-1996, and a hole expanding ratio $\lambda$(%) was determined.

The obtained results are shown in Table 3.

TABLE 1

| Steel No. | Chemical Composition (mass %) | | | | | | | | | | | | Remarks |
|---|---|---|---|---|---|---|---|---|---|---|---|---|---|
| | C | Si | Mn | P | S | Al | N | Cr, V, Mo | Ti, Nb | B | Ni, Cu | Ca, REM | |
| A | 0.13 | 1.02 | 1.34 | 0.015 | 0.002 | 0.035 | 0.0026 | — | — | — | — | — | Suitable Example |
| B | 0.10 | 0.80 | 1.21 | 0.012 | 0.002 | 0.043 | 0.0028 | — | — | — | — | — | Suitable Example |
| C | 0.10 | 1.31 | 0.80 | 0.013 | 0.002 | 0.034 | 0.0031 | — | — | — | — | — | Suitable Example |
| D | 0.12 | 1.43 | 1.02 | 0.011 | 0.002 | 0.041 | 0.0040 | — | — | — | — | — | Suitable Example |
| E | 0.11 | 1.25 | 1.25 | 0.023 | 0.002 | 0.035 | 0.0028 | Cr: 0.31 | — | — | — | — | Suitable Example |
| F | 0.13 | 1.00 | 1.05 | 0.014 | 0.002 | 0.039 | 0.0037 | — | Nb: 0.021 | — | — | — | Suitable Example |
| G | 0.14 | 1.02 | 0.84 | 0.014 | 0.001 | 0.037 | 0.0039 | — | — | — | Ni: 0.1, Cu: 0.2 | — | Suitable Example |
| H | 0.15 | 0.80 | 0.85 | 0.012 | 0.001 | 0.038 | 0.0031 | Mo: 0.1 | — | — | — | — | Suitable Example |
| I | 0.14 | 1.41 | 0.88 | 0.016 | 0.001 | 0.041 | 0.0028 | — | Ti: 0.022 | B: 0.0012 | — | — | Suitable Example |
| J | 0.07 | 1.02 | 1.22 | 0.014 | 0.003 | 0.035 | 0.0036 | V: 0.05 | — | — | — | — | Comparative Example |
| K | 0.09 | 1.56 | 1.24 | 0.011 | 0.001 | 0.042 | 0.0034 | — | — | — | — | REM: 0.002 | Comparative Example |
| L | 0.14 | 1.05 | 1.62 | 0.015 | 0.001 | 0.039 | 0.0035 | — | — | — | — | — | Comparative Example |
| M | 0.14 | 0.73 | 2.01 | 0.012 | 0.001 | 0.039 | 0.0036 | — | — | — | — | — | Comparative Example |
| N | 0.14 | 0.23 | 1.42 | 0.013 | 0.002 | 0.042 | 0.0037 | — | — | — | — | — | Comparative Example |
| O | 0.17 | 1.01 | 1.23 | 0.014 | 0.002 | 0.045 | 0.0034 | — | — | — | — | — | Comparative Example |
| P | 0.10 | 1.32 | 1.15 | 0.012 | 0.001 | 0.035 | 0.0029 | V: 0.05 | — | — | — | — | Suitable Example |
| Q | 0.13 | 1.09 | 1.16 | 0.014 | 0.002 | 0.038 | 0.0024 | — | — | — | — | REM: 0.002 | Suitable Example |
| R | 0.14 | 0.87 | 1.31 | 0.013 | 0.001 | 0.034 | 0.0037 | — | — | — | — | — | Suitable Example |

TABLE 2

| Steel Sheet No. | Steel No. | Hot Rolling Step | | | | Sheet Thickness (mm) | Continuous Annealing Step Annealing First Temperature Region | |
|---|---|---|---|---|---|---|---|---|
| | | Heating Temperature (°C.) | Finish Hot Rolling Temperature (°C.) | Coiling Temperature (°C.) | Cold Rolling Presence/Absence | | Temperature (°C.) | Holding Time (s) |
| 1 | A | 1200 | 900 | 560 | Absence | 1.6 | 820 | 80 |
| 2 | A | 1200 | 900 | 560 | Presence | 1.6 | 820 | 80 |
| 3 | B | 1250 | 900 | 600 | Absence | 1.6 | 800 | 100 |
| 4 | C | 1200 | 920 | 560 | Absence | 1.6 | 820 | 100 |
| 5 | C | 1200 | 920 | 560 | Absence | 1.6 | 820 | 100 |
| 6 | D | 1180 | 920 | 560 | Absence | 1.6 | 820 | 100 |
| 7 | E | 1200 | 920 | 560 | Absence | 1.6 | 820 | 150 |
| 8 | E | 1200 | 920 | 560 | Absence | 1.6 | 820 | 150 |
| 9 | E | 1200 | 920 | 560 | Presence | 1.6 | 820 | 150 |
| 10 | F | 1200 | 920 | 560 | Absence | 1.6 | 820 | 100 |
| 11 | F | 1200 | 920 | 560 | Absence | 1.6 | 820 | 100 |
| 12 | F | 1200 | 920 | 560 | Absence | 1.6 | 715 | 100 |
| 13 | G | 1200 | 900 | 560 | Absence | 1.6 | 840 | 150 |
| 14 | G | 1200 | 900 | 560 | Absence | 1.6 | 840 | 150 |
| 15 | H | 1200 | 900 | 600 | Absence | 1.6 | 820 | 100 |
| 16 | H | 1200 | 900 | 600 | Absence | 1.6 | 820 | 100 |
| 17 | I | 1180 | 920 | 560 | Absence | 1.6 | 820 | 100 |
| 18 | J | 1200 | 920 | 560 | Absence | 1.6 | 800 | 150 |
| 19 | J | 1200 | 920 | 560 | Absence | 1.6 | 800 | 150 |
| 20 | K | 1200 | 920 | 560 | Absence | 1.6 | 840 | 100 |
| 21 | L | 1200 | 880 | 560 | Absence | 1.6 | 800 | 100 |
| 22 | M | 1200 | 880 | 560 | Absence | 1.6 | 800 | 100 |
| 23 | N | 1200 | 880 | 640 | Absence | 1.6 | 800 | 100 |
| 24 | N | 1200 | 900 | 640 | Presence | 1.6 | 800 | 100 |
| 25 | O | 1200 | 900 | 560 | Absence | 1.6 | 820 | 100 |
| 26 | P | 1200 | 920 | 560 | Absence | 1.6 | 820 | 100 |
| 27 | Q | 1200 | 920 | 560 | Absence | 1.6 | 820 | 100 |
| 28 | R | 1200 | 900 | 560 | Absence | 1.6 | 800 | 100 |

| Steel Sheet No. | Continuous Annealing Step Cooling | | | | Galvannealing Temperature (°C.) | Transformation Point | | Remarks |
|---|---|---|---|---|---|---|---|---|
| | Average Cooling Rate to 700° C.* (°C./s) | Second Temperature Region Cooling | | | | $A_{c1}$ (°C.) | $A_{c3}$ (°C.) | |
| | | Cooling Time** (s) | Rate** (°C./s) | Residence Time** (s) | | | | |
| 1 | 6 | 15 | 10 | 20 | 500 | 738 | 866 | Suitable Example |
| 2 | 10 | 15 | 10 | 20 | 500 | 738 | 866 | Comparative Example |

TABLE 2-continued

| | | | | | | | | |
|---|---|---|---|---|---|---|---|---|
| 3 | 10 | 15 | 10 | 50 | 500 | 733 | 871 | Suitable Example |
| 4 | 10 | 15 | 10 | 90 | 500 | 753 | 903 | Suitable Example |
| 5 | 6 | 5 | 30 | 20 | — | 753 | 903 | Comparative Example |
| 6 | 6 | 15 | 10 | 90 | — | 754 | 897 | Suitable Example |
| 7 | 10 | 15 | 10 | 50 | 500 | 751 | 888 | Suitable Example |
| 8 | 3 | 15 | 10 | 150 | 500 | 751 | 888 | Comparative Example |
| 9 | 6 | 15 | 10 | 30 | 500 | 751 | 888 | Comparative Example |
| 10 | 10 | 30 | 5 | 35 | 500 | 741 | 875 | Suitable Example |
| 11 | 10 | 5 | 30 | 50 | 500 | 741 | 875 | Comparative Example |
| 12 | 10 | 19 | 8 | 30 | — | 741 | 875 | Comparative Example |
| 13 | 10 | 15 | 10 | 90 | 500 | 742 | 878 | Suitable Example |
| 14 | 10 | 15 | 10 | 30 | — | 742 | 878 | Suitable Example |
| 15 | 10 | 20 | 8 | 30 | 500 | 737 | 870 | Suitable Example |
| 16 | 6 | 0.2 | 750 | 0.4 | 500 | 737 | 870 | Comparative Example |
| 17 | 6 | 20 | 8 | 90 | 500 | 755 | 907 | Suitable Example |
| 18 | 6 | 15 | 10 | 50 | 500 | 740 | 894 | Comparative Example |
| 19 | 10 | 5 | 30 | 30 | 500 | 740 | 894 | Comparative Example |
| 20 | 10 | 15 | 10 | 50 | — | 755 | 906 | Comparative Example |
| 21 | 10 | 20 | 8 | 50 | 500 | 736 | 858 | Comparative Example |
| 22 | 10 | 20 | 8 | 50 | 500 | 723 | 830 | Comparative Example |
| 23 | 10 | 15 | 10 | 50 | — | 714 | 828 | Comparative Example |
| 24 | 15 | 15 | 10 | 30 | 500 | 714 | 828 | Comparative Example |
| 25 | 15 | 20 | 8 | 30 | 500 | 739 | 862 | Comparative Example |
| 26 | 10 | 15 | 10 | 20 | 500 | 749 | 898 | Suitable Example |
| 27 | 10 | 15 | 10 | 20 | 500 | 742 | 876 | Suitable Example |
| 28 | 10 | 15 | 10 | 90 | 500 | 734 | 851 | Suitable Example |

*Cooling rate (average) from temperature in first temperature region to 700° C.
**Cooling time and average cooling rate (° C./s) between 700° C. and 550° C.
***Residence time from 700° C. to entry into galvanizing bath

TABLE 3

| Steel Sheet No. | Steel No. | Type | Main Phase F* | Second Phase P* | Second Phase M* | Second Phase Retained γ* | Second Phase Total | Second Phase P Fraction* | Average Grain Size of P (μm) |
|---|---|---|---|---|---|---|---|---|---|
| 1 | A | F + P + M | 82.5 | 13.3 | 4.2 | — | 17.5 | 76 | 3.2 |
| 2 | A | F + P + M | 82.2 | 10.4 | 7.4 | — | 17.8 | 58 | 3.3 |
| 3 | B | F + P + M | 87.4 | 12.3 | 0.3 | — | 12.6 | 98 | 3.1 |
| 4 | C | F + P + M + Retained γ | 83.8 | 14.9 | 0.2 | 1.1 | 16.2 | 92 | 3.3 |
| 5 | C | F + M | 84.8 | 0.0 | 15.2 | — | 15.2 | 0 | — |
| 6 | D | F + P + M + Retained γ | 85.8 | 12.6 | 0.2 | 1.4 | 14.2 | 89 | 3.4 |
| 7 | E | F + P + M | 84.7 | 15.1 | 0.2 | — | 15.3 | 99 | 2.9 |
| 8 | E | F + P + M | 90.5 | 15.6 | 0.2 | — | 15.8 | 99 | 3.3 |
| 9 | E | F + P + M | 87.5 | 3.3 | 9.2 | — | 12.5 | 26 | 3.1 |
| 10 | F | F + P + M | 83.2 | 15.2 | 1.6 | — | 16.8 | 90 | 3.3 |
| 11 | F | F + M | 84.9 | 0.0 | 15.1 | — | 15.1 | 0 | — |
| 12 | F | F + C | 90.2 | 0.0 | 0.0 | — | 9.8 | 0 | — |
| 13 | G | F + P + M + Retained γ | 87.1 | 12.5 | 0.4 | 1.2 | 14.1 | 89 | 3.5 |
| 14 | G | F + P | 86.3 | 13.7 | 0.0 | — | 13.7 | 100 | 3.6 |
| 15 | H | F + P + M | 84.9 | 14.8 | 0.3 | — | 15.1 | 98 | 3.1 |
| 16 | H | F + M | 54.8 | 0.0 | 45.2 | — | 45.2 | 0 | — |
| 17 | I | F + P + M + Retained γ | 84.8 | 14.9 | 0.3 | 1.6 | 16.8 | 89 | 3.4 |
| 18 | J | F + P + M | 91.4 | 8.5 | 0.1 | — | 8.6 | 99 | 3.2 |
| 19 | J | F + P + M | 87.5 | 5.9 | 6.6 | — | 12.5 | 47 | 3.1 |
| 20 | K | F + P + M | 85.5 | 2.3 | 12.2 | — | 14.5 | 16 | 3.4 |
| 21 | L | F + M | 85.7 | 0.0 | 14.3 | — | 14.3 | 0 | — |
| 22 | M | F + M | 83.6 | 0.0 | 16.4 | — | 16.4 | 0 | — |
| 23 | N | F + P + M | 88.8 | 10.7 | 0.5 | — | 11.2 | 96 | 3.2 |
| 24 | N | F + P + M | 88.0 | 11.2 | 0.8 | — | 12.0 | 93 | 3.2 |
| 25 | O | F + P + M | 90.5 | 5.2 | 4.3 | — | 9.5 | 55 | 3.5 |
| 26 | P | F + P + M | 82.4 | 12.1 | 3.2 | — | 15.3 | 79 | 3.6 |
| 27 | Q | F + P + M | 84.2 | 14.8 | 1.8 | — | 16.6 | 89 | 3.5 |
| 28 | R | F + P + M + Retained γ | 83.4 | 15.2 | 2.1 | 1.5 | 18.8 | 81 | 3.4 |

| No. | Yield Strength YS (MPa) | Tensile Strength TS (MPa) | Elongation El (%) | Stretch Flangeability λ (%) | Remarks |
|---|---|---|---|---|---|
| 1 | 453 | 615 | 31.1 | 108 | Invention Example |
| 2 | 432 | 634 | 31.2 | 69 | Comparative Example |

TABLE 3-continued

| | | | | | |
|---|---|---|---|---|---|
| 3 | 435 | 548 | 33.4 | 127 | Invention Example |
| 4 | 459 | 545 | 35.6 | 132 | Invention Example |
| 5 | 490 | 711 | 26.8 | 65 | Comparative Example |
| 6 | 468 | 597 | 32.6 | 109 | Invention Example |
| 7 | 441 | 544 | 33.4 | 123 | Invention Example |
| 8 | 424 | 523 | 32.1 | 118 | Comparative Example |
| 9 | 444 | 590 | 31.8 | 67 | Comparative Example |
| 10 | 470 | 602 | 31.8 | 111 | Invention Example |
| 11 | 511 | 741 | 24.7 | 54 | Comparative Example |
| 12 | 401 | 525 | 31.1 | 80 | Comparative Example |
| 13 | 487 | 605 | 32.1 | 117 | Invention Example |
| 14 | 462 | 575 | 31.7 | 120 | Invention Example |
| 15 | 452 | 556 | 33.1 | 118 | Invention Example |
| 16 | 664 | 1066 | 13.8 | 32 | Comparative Example |
| 17 | 485 | 634 | 31.1 | 109 | Invention Example |
| 18 | 386 | 485 | 35.1 | 131 | Comparative Example |
| 19 | 415 | 563 | 32.4 | 62 | Comparative Example |
| 20 | 389 | 613 | 33.6 | 58 | Comparative Example |
| 21 | 430 | 628 | 30.2 | 56 | Comparative Example |
| 22 | 463 | 662 | 28.9 | 51 | Comparative Example |
| 23 | 423 | 509 | 34.2 | 115 | Comparative Example |
| 24 | 450 | 518 | 33.7 | 109 | Comparative Example |
| 25 | 524 | 684 | 26.8 | 69 | Comparative Example |
| 26 | 473 | 578 | 32.4 | 121 | Invention Example |
| 27 | 464 | 586 | 31.8 | 119 | Invention Example |
| 28 | 483 | 602 | 32.7 | 108 | Invention Example |

*F: ferrite, P: pearlite, M: martensite, Retained γ: retained austenite, C: cementite
**P fraction: area fraction of P/total area fraction of second phase In all of our examples, high strength galvanized steel sheets having excellent formability with high strength, that is, a tensile strength TS of 540 MPa or higher, high ductility, that is, an elongation El of 30% or greater, and excellent stretch flangeability, that is, a hole expanding ratio λ of 80% or higher are obtained. On the other hand, in the comparative examples that are not within our range, the desired high strength is not obtained, the desired elongation is not obtained, or the desired hole expanding ratio λ is not obtained, and formability is poor.

The invention claimed is:

1. A high strength galvanized steel sheet having excellent formability, comprising a steel sheet which is a base sheet and a galvanized layer on a surface of the steel sheet, wherein the steel sheet is a high strength steel sheet which has a composition comprising, by mass %,
   0.08 to 0.15% of C, 0.5 to 1.5% of Si,
   0.5 to 1.5% of Mn, 0.1% or less of P,
   0.01% or less of S, 0.01 to 0.1% of Al,
   0.005% or less of N, and
   the balance Fe with inevitable impurities, and a microstructure composed of 75 to 90% of a ferrite phase as a main phase and 10 to 25% of a second phase including at least pearlite in terms of an area fraction with respect to the entire microstructure; an average grain size of the pearlite is 5 μm or smaller; and the pearlite has an area fraction of 70% or greater with respect to the total area of the second phase.

2. The high strength galvanized steel sheet according to claim 1, wherein the composition further comprises, by mass %, one or more selected from the group consisting of 0.05 to 0.5% of Cr, 0.005 to 0.2% of V, and 0.005 to 0.2% of Mo.

3. The high strength galvanized steel sheet according to claim 1, wherein the composition further comprises, by mass %, one or two selected from the group consisting of 0.01 to 0.1% of Ti and 0.01 to 0.1% of Nb.

4. The high strength galvanized steel sheet according to claim 1, wherein the composition further comprises, by mass %, 0.0003 to 0.0050% of B.

5. The high strength galvanized steel sheet according to claim 1, wherein the composition further comprises, by mass %, one or two selected from the group consisting of 0.05 to 0.5% of Ni and 0.05 to 0.5% of Cu.

6. The high strength galvanized steel sheet according to claim 1, wherein the composition further comprises, by mass %, one or two selected from the group consisting of 0.001 to 0.005% of Ca and 0.001 to 0.005% of total REM.

7. The high strength galvanized steel sheet according to claim 1, wherein the galvanized layer is a galvannealed layer.

8. A method of manufacturing the high strength galvanized steel sheet having excellent formability according to claim 1 comprising:
   a hot rolling step of subjecting a steel to hot rolling to form a hot rolled sheet;
   pickling of the hot rolled sheet;
   a continuous annealing step of subsequently subjecting the hot rolled sheet to annealing and subsequent cooling to a temperature for entry into a galvanizing bath; and,
   after the continuous annealing step, a galvanizing step of performing galvanizing to form a galvanized layer on a surface of the hot rolled sheet by dipping the hot rolled sheet in the galvanizing bath,
   the continuous annealing step and the galvanizing step being continuously performed with a continuous galvanizing line to manufacture a galvanized steel sheet having the galvanized layer on the surface thereof, wherein the steel has a composition comprising, by mass %,
   0.08 to 0.15% of C, 0.5 to 1.5% of Si,
   0.5 to 1.5% of Mn, 0.1% or less of P,
   0.01% or less of S, 0.01 to 0.1% of Al,
   0.005% or less of N, and
   the balance Fe with inevitable impurities;
   the annealing is performed by holding the sheet for 5 to 400 s in a first temperature region of an $A_{c1}$ transformation point to an $A_{c3}$ transformation point; and,
   in cooling after the annealing, the sheet is cooled from a first temperature region to 700° C. at an average cooling rate of 5° C./s or higher, and a residence time in a second temperature region of 700° C. to the temperature for entry into the galvanizing bath is 15 to 400 s.

9. The method according to claim 8, wherein the hot rolling step comprises heating the steel at a temperature of 1100° C. to 1280° C.; subsequently subjecting the steel to hot rolling with a finish hot rolling temperature of 870° C. to 950° C. to form a hot rolled sheet; and, after the hot rolling, coiling the hot rolled sheet at a coiling temperature of 350° C. to 720° C.

10. The method according to claim 8, wherein a cooling time in a temperature region of 700° C. to 550° C. in the second temperature region is 10 s or longer.

11. The method according to claim 8, wherein an alloying step of alloying the galvanized layer is performed subsequent to the galvanizing step.

12. The method according to claim 8, wherein the composition further comprises, by mass %, one or more selected from the group consisting of 0.05 to 0.5% of Cr, 0.005 to 0.2% of V, and 0.005 to 0.2% of Mo.

13. The method according to claim 8, wherein the composition further comprises, by mass %, one or two selected from the group consisting of 0.01 to 0.1% of Ti and 0.01 to 0.1% of Nb.

14. The method according to claim 8, wherein the composition further comprises, by mass %, 0.0003 to 0.0050% of B.

15. The method according to claim 8, wherein the composition further comprises, by mass %, one or two selected from the group consisting of 0.05 to 0.5% of Ni and 0.05 to 0.5% of Cu.

16. The method according to claim 8, wherein the composition further comprises, by mass %, one or two selected from the group consisting of 0.001 to 0.005% of Ca and 0.001 to 0.005% of total REM.

* * * * *